United States Patent [19]
Chittineni

[11] Patent Number: 4,633,400
[45] Date of Patent: Dec. 30, 1986

[54] METHOD FOR WAVEFORM FEATURE EXTRACTION FROM SEISMIC SIGNALS

[75] Inventor: Chittibabu Chittineni, Ponca City, Okla.

[73] Assignee: Conoco Inc., Ponca City, Okla.

[21] Appl. No.: 685,037

[22] Filed: Dec. 21, 1984

[51] Int. Cl.$^4$ ............................................. G06K 9/48
[52] U.S. Cl. ...................... 364/421; 382/21
[58] Field of Search .................. 364/421, 822; 382/21

[56] References Cited

U.S. PATENT DOCUMENTS

| | | | |
|---|---|---|---|
| 4,093,941 | 6/1978 | Bryan et al. | 382/21 |
| 4,326,190 | 4/1982 | Borland et al. | 382/9 |
| 4,487,476 | 12/1984 | Hester et al. | 364/822 |
| 4,490,848 | 12/1984 | Beall et al. | 382/21 |
| 4,494,105 | 1/1985 | Beall et al. | 382/21 |

*Primary Examiner*—Jerry Smith
*Assistant Examiner*—Charles B. Meyer
*Attorney, Agent, or Firm*—Charles E. Quarton

[57] ABSTRACT

A computer implemented method for representation and recognition of waveforms uses information derived from several groups of such waveforms of general similarity. Each signal is considered as an additive combination of the common signal of the respective group and a noise term. The common signals of the groups of waveforms are extracted using a set of data-derived orthonormal basis waveforms, and a criterion is developed to evaluate the combination of individual basis waveforms used for the common signal extraction. The estimated common signals then represent a template pattern of the waveform or signal groups that can be used in waveform recognition.

18 Claims, 11 Drawing Figures

METHOD FOR WAVEFORM FEATURE EXTRACTION FROM SEISMIC SIGNALS

BACKGROUND OF THE INVENTION

1. Field of the Invention

The invention relates generally to pattern recognition systems and, more particularly, but not by way of limitation, it relates to an improved digital process for representation and detection of specific waveforms extracted from seismic signal data in the presence of noise.

2. Description of the Prior Art

The prior art attempts at the extraction of common signals have been conbined to a single group of signals. One well-known prior method is that known as "stacking" or "weighted stacking." One form of this technique is proposed in such as W. H. Mayne, "Common Reflection Point Horizontal Stacking Techniques," *Geophysics,* Vol. 27, pp. 927–938, wherein it was suggested that a group of seismic signals may be combined by simple addition to provide a common signal estimation. Such simple addition does not extract optimally a common signal of a group of signals.

Another work of interest is that of Gimlim, Keener and Lawrence, "Maximum Likelihood Stacking in White Gaussian Noise With Unknown Variances," IEE Trans., *Geoscience and Remote Sensing,* Jan. 1982, pp. 91–98. Such maximum likelihood signal extraction technique requires numerical estimation of a large number of parameters, and it is a process that usually has convergence difficulties and whose solution depends upon the initial parameter values. Still other forms of maximum likelihood filtering of reflection seismograms have been carried out in a method which requires the knowledge of signal and noise spectral densities which, in most cases, are not available. All of these prior art approaches function with input of a single group of signals and they do not take into account such as correlations of signals between different groups of signals.

Several other prior sources treated the waveform recognition and classification problem. These teachings used time series models such as autoregressive models of certain order to represent the signals, and they then use the co-efficients of such models in a pattern recognition framework for the classification of signals. The difficulties associated with this approach are that the optimal model order may vary from trace-to-trace and the pattern recognition approach requires fixing of the model order. The discriminating information of the signals may not condense into the co-efficients of the autoregressive models. All such prior teachings view each trace independently and they do not take into account correlations between different signals of a single group or different signals of different groups in the estimation of model co-efficients. These prior teachings are exemplified by such as P. Bois, "Autoregressive Pattern Recognition Applied To The Delimitation of Oil and Gas Reservoirs," *Geophysical Prospecting,* Vol. 28, 1980, pp. 582–591.

SUMMARY OF THE INVENTION

The present invention relates to a computer-implemented process for identification and representation of the commonality of time analog signals from groups of generally related signals. For example, in the processing of one or more groups of related seismic signals such as those commonly present in a seismic section, the process functions to define common signals of a group or of groups of groups for subsequent comparison and classification in accordance with meaningful characterization. Each signal in a given set of groups of signals is considered as an additive combination of the common signal of its group and some noise term. The extraction of common signals of the groups is done by expanding a selected waveform of a group uniquely in terms of a set of data derived orthonormal basis waveforms for subsequent identification of selected signal properties. The orthogonality of the basis waveforms provides a framework for estimation of such signal properties, and the common signals of the groups are extracted as a weighted combination of a subset of such estimated orthonormal basis waveforms. The particular waveforms that are used for the estimation of common signals of a group are selected based upon an expression for the representation error that uses the property that each signal is an additive combination of the common signal of its group plus a noise term. Information in the correlation of signals at different time lags may also be used in the estimation of common signals.

The estimated common signals may then be viewed as the template or general pattern of each of the signal groups. In turn, these common signals may be used in recognition of similar waveform types through comparison in a correlation-type detection scheme. The weights and the expansion of waveforms are also used as features for signal detection, and maximization of the average distance between the feature vectors of a pair of different group types can be used as a criterion for the selection of an efficient set of features. When there are more than two group types derived, the maximization of the minimum value of the distance between the pairs of group types, or the expected value of the distance between the pairs of group types, is used as a criterion for the selection of an efficient set of features. These extracted features may then be used in a pattern recognition framework for final signal detection.

Therefore, it is an object of the present invention to extract an efficient set of waveform features from a plurality of related time analog signals in order to better recognize selected meaningful signal from noise signal.

It is also an object of the invention to extract from noisy seismic signal data the features that are useful in the interpretation of seismic traces.

It is yet further an object of the present invention to provide an effective process for noisy seismic signal data that provides improved recognition of selected relection patterns, stratigraphic correlations, lateral facies identification and other subsurface lithologic conditions.

It is still further an object of the present invention to provide a seismic signal data process that better delineates hydrocarbon producing zones and defines reservoir limits.

Finally, it is an object of the present invention to provide a method for identification of signal content within noisy signal data within one group or groups of groups of related time analog signals.

Other objects and advantages of the invention will be evident from the following detailed description when read in conjunction with the accompanying drawings which illustrate the invention.

DETAILED DESCRIPTION OF THE INVENTION

This invention is different from the prior art in that, (a) it uses the data determined orthonormal basis waveforms, and (b) it uses the waveforms of multiple groups simultaneously for feature extraction. The invention achieves the extraction of a set of features as well as the assessment of their importance in the representation and recognition of waveforms.

Assuming that there are J-groups and N-waveforms in each group, each waveform can be considered as an additive combination of signal and random noise components. Waveform feature extraction can be achieved by expanding each waveform as a linear combination of data derived orthonormal basis waveforms and assessing the importance of each orthonormal basis function. When a full set of basis functions are used, the representation error in the least squares error sense will be zero. Thus, no information is lost in the representation of waveforms in the sense that the waveforms can be fully reconstructed using orthonormal basis functions. Use of fewer than a full set of basis functions in the representation of waveforms allows the noise component to be filtered while restoring the signal part, a desirable end.

Figure 1:
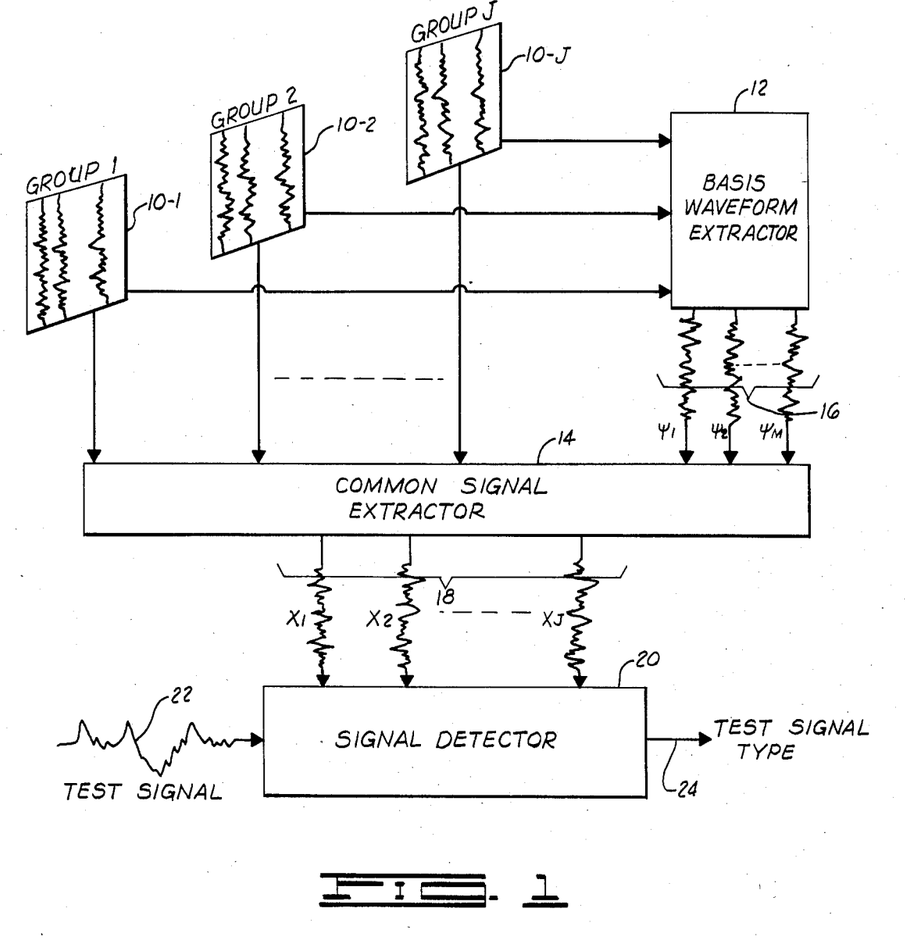
FIG. 1 is a functional block diagram illustrating the basic stages of the waveform representation and recognition process of the present invention.

FIG. 1 illustrates the essential functional stages of the method for processing one or more groups of related time-analog signals. Thus, signal groups 10-1, 10-2 through 10-J each including a plurality of related signals provide input to each of two selected function stages, a basis waveform extractor 12 and a common signal extractor 14. The input groups 10 may be such as a family of seismic trace sections which normally would be pre-processed through various dynamic and static corrections. The trace groups 10 are applied to basis waveform extractor 12 which, in turn, derives basis waveform data via lines 16 which is also input to common signal extractor stage 14. Stage 14 then provides common signal data output via lines 18 to a signal detector stage 20. The signal detector stage 20 functions in the manner of a signal correlator so that an input test signal such as 22 may be correlated with the common signals of the groups at input line 18 to provide output of a test signal type indication at position 24.

Figure 2:
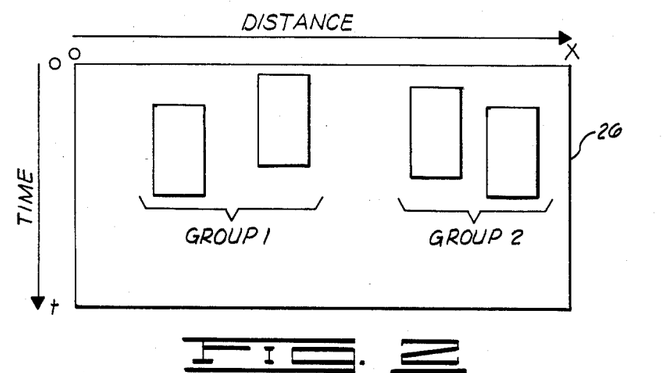
FIG. 2 is a layout diagram illustrating selected general locations of groups of waveforms on a seismic section.

FIG. 2 illustrates a seismic section 26 that may effectively utilize the extraction process of FIG. 1. Thus, the section 26, with travel time on the ordinate and surface distance on the abscissa, may be such as a stacked seismic section along a predetermined seismic survey line. The seismic section 26 is shown with designation of selected subportions of the seismic data being divided into groups, such groups being generally classified as a result of prior interpretation or from known terrain conditions in the area. For example, such group designations may be selected to surround known hydrocarbon producing and non-producing areas proximate the survey lines. Examination of the signal groups, and extraction and classification of the basis waveform and common signals, may then result in a signal template that can be applied across a much wider survey area further to classify the similar subterranean zones.

Figure 3:
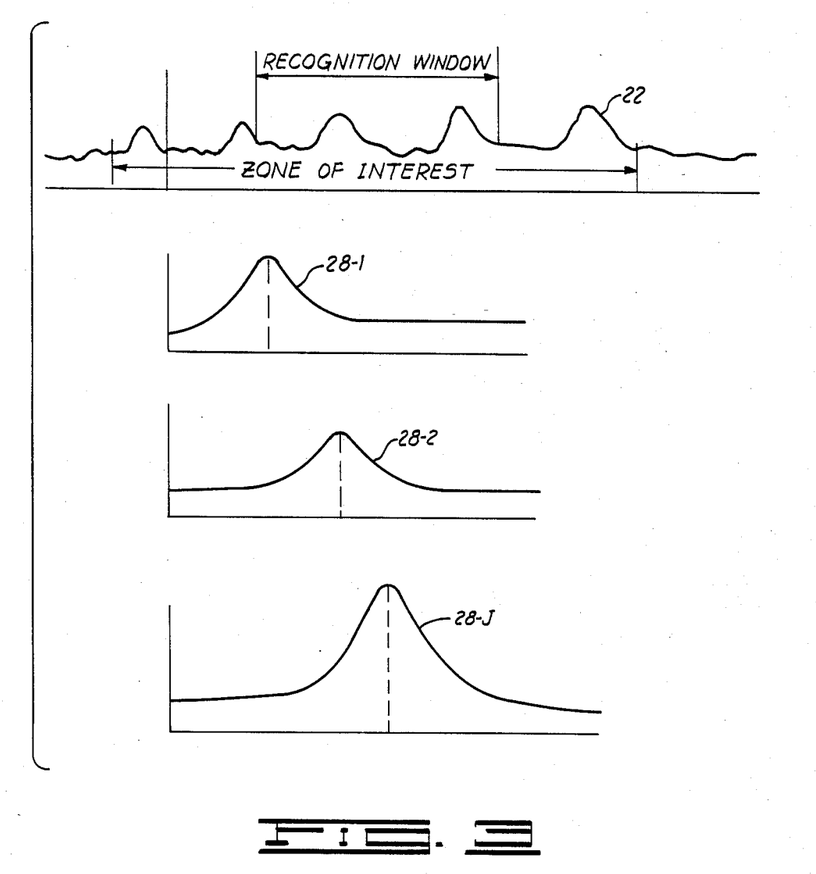
FIG. 3 depicts the concept of a correlation signal detector as utilized in the present invention.

FIG. 3 illustrates the manner in which common signals of the selected groups can be input to signal detector 20 for correlation with a selected test signal 22 in order to classify as to signal type for further interpretive evaluation. The common signals $X_1$-$X_J$ (FIG. 1) may be regarded as the template patterns that represent the waveforms of each of the groups, and the signal detector 20 correlates to determine signal type of the input test signal 22. In the signal detector 20, the zone of interest for recognizing the test signal 22 is determined. The normalized correlation of the test signal with the extracted common signals are computed by sliding them on the test signal in the zone of interest. If the event spacings change to any material extent, then nonlinear correlation may be utilized in signal detector stage 20. The zone of interest is examined within the recognition window duration to determine a correlation profile for the test signal relative to each common signal, i.e. correlation signals 28-1, 28-2 through 28-J.

There are first presented some details of mathematical analysis that are common to all of basis waveform extraction and common signal extraction. In the following, capital letters will be used to denote matrices and small letters will be used to denote vectors. We will be using the following vector-matrix conversion relationship throughout the specification.

Letting $\Psi(t)$ be a $N_1 \times J_1$ matrix, the $J_1 \times 1$ vector $u_j$ and the $N_1 J_1 \times N_1$ matrix $M_j$ is defined as $$u_j = \begin{bmatrix} 0 \\ \cdot \\ \cdot \\ \cdot \\ 0 \\ 1 \\ 0 \\ \cdot \\ \cdot \\ \cdot \\ 0 \end{bmatrix} \begin{matrix} 1 \\ \\ \\ \\ j-1 \\ j \\ j+1 \\ \\ \\ \\ J_1 \end{matrix} \quad \text{and} \quad M_j = \begin{bmatrix} O \\ \cdot \\ \cdot \\ I \\ \cdot \\ \cdot \\ O \end{bmatrix} \begin{matrix} 1 \\ \\ \\ j \\ \\ \\ J_1 \end{matrix} \quad (1)$$

where I is an $N_1 \times N_1$ unity matrix. Let the $N_1 J_1 \times 1$ vector $\Psi(t)$ be the vector representation of the matrix $\Psi(t)$ that is formed by column stacking the elements of matrix $\Psi(t)$. Then $\Psi(t)$ can be written as $$\psi(t) = \sum_{j=1}^{J_1} M_j \Psi(t) u_j \quad (2)$$

The vector $u_j$ extracts the $j^{th}$ column of the matrix $\Psi(t)$ and the matrix $M_j$ places this column into the $j^{th}$ segment of the vector $\Psi(t)$. The inverse relation of putting the vector $\Psi(t)$ into matrix form $\Psi(t)$ can be written as $$\Psi(t) = \sum_{i=1}^{J_1} M_i^T \psi(t) u_i^T \quad (3)$$

Let $G_{ij}(t)$, $1 \leq i \leq N$, $1 \leq j \leq J$ be a given set of groups of waveforms or signals where N is the number of signals in each group and J is the number of groups. Without loss of generality, it may be assumed that the number of signals in each group is the same. Let $G(t)$ be the $N \times J$ matrix whose i,jth element is $G_{ij}(t)$, and let $G_{.i}(t)$ be an $N \times 1$ column vector that is the $i^{th}$ column of $G(t)$. It may then be assumed that each signal $G_{ij}(t)$ of group j can be written as the summation of the common signal of the group $x_j(t)$ and a noise term $n_{ij}(t)$. That is $$G_{ij}(t) = x_j(t) + n_{ij}(t), \quad \begin{array}{l} 1 \leq i \leq N \\ 1 \leq j \leq J \end{array} \quad (4)$$

Given the signals $G_{ij}(t)$, the goal of flow stages 12 and 14 is to extract the common signals $x_j(t)$ of the groups, using the information from all of the signals. This is based on the following observation. If a signal can be decomposed uniquely as a weighted combination of a set of data-derived orthonormal basis waveforms, without loss of generality the basis waveforms can be used to estimate signal properties. In particular, the common signals on lines 18 for the groups 10 can be estimated using basis waveforms. The following details the major components for elements of the waveform representation and recognition procedure.

The flow stage 12 serves to extract the data-derived orthonormal basis waveforms. The orthonormal basis waveforms are chosen so that when the given signals are estimated as a linear combination of these basis waveforms, the estimation error is minimized. The importance of the individual basis waveforms is also discussed hereinbelow relative to estimation of the signals.

Let $\Psi_{ij}(t)$, $1 \leq i \leq N$, $1 \leq j \leq J$ be a set of orthonormal base waveforms that satisfy $$\int \Psi_{ij}(t) \Psi_{lm}(t) dt = \begin{cases} 0 & \text{if } i \neq l \text{ or } j \neq m \\ 1 & \text{if } i = l \text{ and } j = m \end{cases} \quad (5)$$

Let $\hat{G}_{ij}(t)$ be an estimate of $G_{ij}(t)$ that is estimated as a linear combination of M basis waveforms where $M = N_1 J_1 = NJ$. Let $G(t)$ and $\hat{G}(t)$ be the matrices of size $N \times J$ and $\Psi(t)$ be the matrix of size $N_1 \times J_1$ with the elements $G_{ij}(t)$, $\hat{G}_{ij}(t)$ and $\Psi_{ij}(t)$, respectively. Let $g(t)$, $\psi(t)$ and $\hat{g}(t)$ be the vectors formed by column stacking the elements of the matrices $G(t)$, $\Psi(t)$ and $\hat{G}(t)$, respectively. Let $g(t)$ be estimated as $$\hat{g}(t) = T \psi(t) \quad (6)$$

where T is a $NJ \times N_1 J_1$ size matrix of weights. Using equations (2), (3) and (5), $G(t)$ can be written as $$\hat{G}(t) = \sum_{i=1}^{J} N_i^T g(t) v_i^T = \sum_{i=1}^{J} \sum_{j=1}^{J} T_{ij} \xi_{ji}(t) \quad (7)$$

where $T_{ij} = N_i^T T M_j$ \quad (8)

and $\xi_{ji}(t) = \Psi(t) u_j v_i^T$ \quad (9)

The $N \times N_1$ matrix $T_{ij}$ is the $(ij)^{th}$ submatrix of T. The $N_1 \times J$ matrix $\xi_{ji}(t)$ has zero elements except in the $i^{th}$ column. The $i^{th}$ column of $\xi_{ji}(t)$ contains the $j^{th}$ column of $\Psi(t)$. Since the elements of $\psi(t)$ are orthonormal, there derives $$\int \psi(t) \psi^T(t) dt = I \quad (10)$$

The estimation error F' can be written as $$F' = tr[\int (G(t) - \hat{G}(t))(G(t) - \hat{G}(t))^T dt] \quad (11)$$

and from equations (9) and (10), we get $$\int \xi_{ji}(t) \xi_{ji}^T(t) dt = I \quad (12)$$

Use of equation (12) in equation (7) yields $$T_{ij} = \int G_{.i}(t) \Psi_{.j}^T(t) dt \quad (13)$$

where $G_{.i}(t)$ is the $i^{th}$ column of $G(t)$ and $\Psi_{.j}(t)$ is the $j^{th}$ column of $\Psi(t)$. From equations (7), (12) and (13), we get $$\int \hat{G}(t) \hat{G}^T(t) dt = \int \hat{G}(t) \hat{G}^T(t) dt = \sum_{i=1}^{J} \sum_{j=1}^{J_1} T_{ij} T_{ij}^T \quad (14)$$

Introducing lagrangian multipliers and using equation (14) in equation (11), the functional F to be minimized for the estimation of orthonormal basis waveforms can be written as $$F = tr\left[\int G(t) G^T(t) dt - \sum_{i=1}^{J} \sum_{j=1}^{J_1} T_{ij} T_{ij}^T\right] + \\ tr\left\{\sum_{j=1}^{J_1} \beta_j [\int \xi_{ji}(t) \xi_{ji}^T(t) dt - I]\right\} \quad (15)$$

where $\beta_j$ is an $N_1 \times N_1$ diagonal matrix of lagrangian multipliers. Differentiating F with respect to $\beta_j$ and $\Psi_{.j}(t)$, and equating the resulting expressions to zero, yields $$\int \Psi_{.j}(t) \Psi_{.j}^T(t) dt = I \quad (16)$$

$$\Psi_{.j}(t) = \beta_j^{-1} \sum_{i=1}^{J} T_{ij}^T G_{.i}(t) \quad (17)$$

From equations (16) and (17) we get $$\sum_{l=1}^{J} \sum_{m=1}^{J} T_{lj}^T r_{lm} T_{mj} = \beta_j^2 \quad (18)$$

where $r_{lm} = \int G_{.l}(t) G_{.m}^T(t) dt$ \quad (19)

Let r be an NJ×NJ matrix with $r_{lm}$ as its submatrices. Let $T_j^T = (T_{1j}^T, T_{2j}^T \ldots T_{Jj}^T)$ and $e_j^T = (e_{1j}^T, e_{2j}^T \ldots e_{Jj}^T)$ be the matrices of dimension N1×NJ. Let $e_{ij}$ be the N×N₁ submatrices of $e_j$. Let the eigenvectors $(j-1)N_1+i$, $1 \leq i \leq N_1$ of matrix r be the columns of $e_j$; and, let $\Lambda_j$ be an $N_1 \times N_1$ diagonal matrix with the diagonal elements being the eigen-values $(j-1)N_1+i$, $1 \leq i \leq N_1$ of matrix r, $T_j$ is then chosen as $$T_j = e_j \Lambda_j^{\frac{1}{2}} \tag{20}$$

Use of equation (20) in (18) yields $$\beta_j^2 = \Lambda_j^{\frac{1}{2}} \sum_{l=1}^{J} e_{lj}^T \left( \sum_{m=1}^{J} r_{lm} e_{mj} \right) \Lambda_j^{\frac{1}{2}} = \Lambda_j^2 \tag{21}$$

and substituting equation (21) in equation (17), we get $$\Psi_j(t) = \Lambda_j^{-\frac{1}{2}} \sum_{i=1}^{J} e_{ij}^T G_i(t) \tag{22}$$

From equations (11), (13) and (14), the error $\epsilon^2$ in the estimation of the signals $G_{ij}(t)$ can be obtained as $$\epsilon^2 = tr[\int G(t)G^T(t)dt] - tr\left[ \sum_{i=1}^{J} \sum_{j=1}^{J} T_{ij}T_{ij}^T \right] \tag{23}$$

Noting that $$\sum_{j=1}^{NJ} \lambda_j = tr[\int G(t)G^T(t)dt] \tag{24}$$

and using equations (22) and (24) in (23), we get $$\epsilon^2 = \sum_{j=N_1J_1+1}^{NJ} \lambda_j \tag{25}$$

Equation (25) shows that the estimation error will be zero if all the NJ basis waveforms are used in the estimation of G(t). If only a subset of the basis waveforms are used in the estimation of G(t), the estimation error will be equal to the sum of the eigenvalues of r corresponding to the eigenvectors that are not used in the estimation of G(t).

The common signal extractor stage 14, receiving data inputs from the respective groups 10-1 through 10-J as well as extracted basis waveform data on lines 16, functions variously to extract meaningful data. In one operating mode, stage 14 functions to estimate the common signals for one or more group data inputs as a weighted combination of basis waveforms. That is, the estimates of the common signals of the groups may be viewed as weighted sums of the projections of the respective signals onto the eigenvectors of the signal correlation matrix. Second, stage 14 functions to assess the importance of the individual basis waveforms when estimated. In this mode, there is derived a relationship between the individual and the total number of basis wave forms used in estimation of the common signal vector x(t) and this relationship provides an evaluation of the importance of individual basis waveforms in the common signal estimation. Third, stage 14 may function to explore the estimation of common signals when using basis waveforms at different time lags. This is carried out using signal correlations at different reference time delays.

In the first mode, common signal estimation of a weighted combination of basis waveforms, let x(t) be a J×1 vector whose $j^{th}$ component $x_j(t)$ is the common signal to the $j^{th}$ group. Let $\Psi_j(t)$ be an $N_1 \times 1$ vector of basis waveforms. Then estimating x(t) as a linear combination of $N_1J_1$ basis waveforms ($N_1J_1 < NJ$), we get $$\hat{x}(t) = \sum_{j=1}^{J_1} a_j \Psi_j(t) = a\psi(t) = \sum_{j=1}^{J_1} a_j M_j \Psi(t) u_j \tag{26}$$

Where the $J \times N_1$ matrix $a_j$ is a submatrix of $J \times N_1J_1$ matrix, let $$C = (1, 1 \ldots 1)^T \tag{27}$$

be an N×1 column vector with unit elements. The criterion $\Phi$ of the sum of squares of errors for the estimation of $\alpha$ can be written as:

$$\Phi = tr\{\int [(G(t) - c\hat{x}^T(t))(G(t) - c\hat{x}^T(t))^T]dt\} \tag{28}$$

and on simplification equation (28) becomes $$\Phi = tr[\int G(t)G^T(t)dt] - 2tr\left( \sum_{j=1}^{J} [\int G^T(t)c\Psi_j^T(t)dt]a_j^T \right) + Ntr\left( \sum_{j=1}^{J_1} a_j a_j^T \right) \tag{29}$$

Differentiating $\Phi$ of equation (29) with respect to $a_j$ and equating the resulting expression to zero, yields $$a_j = \frac{1}{N} \int G^T(t) c \psi_j(t) \, dt \tag{30}$$

Substituting equation (30) in equation (29), we get $$\Phi = tr[\int G(t)G^T(t)dt] - Ntr\left[ \sum_{j=1}^{J_1} a_j a_j^T \right] \tag{31}$$

then using equations (7) and (22) in (30), we obtain $$a_j = \frac{1}{N} \sum_{l=1}^{N} \sum_{i=1}^{J} [\int G_L(t) G_i^T(t) dt] e_{ij} \Lambda_j^{-\frac{1}{2}} \tag{32}$$

where $G_L^T(t)$ is the $l^{th}$ row of G(t). Let $\bar{G}(t)$ be the sum of N rows of G(t), that is $$\bar{G}(t) = \left[ \sum_{l=1}^{N} G_{l1}(t) \sum_{l=1}^{N} G_{l2}(t) \cdots \sum_{l=1}^{N} G_{lJ}(t) \right] \tag{33}$$

Let $e_i^l{}_j$ be the $l^{th}$ row of $e_{ij}$ and let $\bar{e}_{ij}$ be the sum of N rows of $e_{ij}$. That is, $$\bar{e}_{ij} = \sum_{l=1}^{N} e_{ij}^l \tag{34}$$

From equations (32) and (34), we then obtain $$\alpha_j = \frac{1}{N} \begin{bmatrix} \bar{e}_{1j} \\ \bar{e}_{2j} \\ \vdots \\ \bar{e}_{Jj} \end{bmatrix} \lambda_j^{\frac{1}{2}} \quad (35)$$

and using equation (35) in equation (26), the common signal of the $l^{th}$ group is estimated as $$\hat{x}_l(t) = \frac{1}{N} \sum_{i=1}^{J} \sum_{j=1}^{J_1} [\bar{e}_{lj} \bar{e}_{ij}^T G_i(t)] \quad (36)$$

When $J_1 = J$ and $N_1 = N$, that is when all of the NJ basis waveforms are used in the estimation of $x(t)$, equation (36) becomes the following:

$$\hat{x}_l(t) = \frac{1}{N} \left[ \left\{ \sum_{j=1}^{J} \bar{e}_{lj} \bar{e}_{lj}^T \right\} G_l(t) + \sum_{\substack{i=1 \\ \neq l}}^{J} \sum_{j=1}^{J} \bar{e}_{lj} \bar{e}_{ij}^T G_i(t) \right] \quad (37)$$

$$= \frac{1}{N} \sum_{i=1}^{N} G_l(t)$$

Equation (37) then shows that the common signal of the group is estimated as the average of the signals in that group if all of the basis waveforms are used in the estimation. Let $R(l,j)$, $1 \leq l \leq NJ$ be the $j^{th}$ eigenvector of the correlation matrix $r$. For $N_1 \neq N$ or $J_1 \neq J$, the estimate of the common signal of the $l^{th}$ group can be obtained from equation (36) as $$\hat{x}_l(t) = \sum_{j=1}^{N_1 J_1} \left\{ \left( \frac{1}{N} \sum_{m=1}^{N} R((l-1)N + m,j) \right) \left( \sum_{i=1}^{J} \sum_{k=1}^{N} R((i-1)N + k,j) G_{ki}(t) \right) \right\} \quad (38)$$

which illustrates that the estimates of the common signals of the groups can be thought of as the weighted sums of the projections of the signals onto the eigenvectors of the signal correlation matrix.

In the second mode, stage 14 serves to evaluate the individual basis waveforms in the common signal estimation. Let $\bar{x}(t)$ be an estimate of common signal vector $x(t)$ when NJ basis waveforms are used, and let $\hat{x}(t)$ be an estimate of $x(t)$ when $N_1 J_1$ basis waveforms are used, where $N_1 J_1 \leq NJ$. Define $y(t)$ as $$y(t) = \hat{x}(t) - \bar{x}(t) \quad (39)$$

and let $\bar{\Phi}_m$ be the minimum value of the criterion when NJ basis waveforms are used in the estimation of $x(t)$ where $$\bar{\Phi}_m = \sum_{j=1}^{J} \sum_{i=1}^{N} \int (G_{ij}(t) - \bar{x}_j(t))^2 dt \quad (40)$$

Let $\Phi_m$ be the minimum value of the criterion if $N_1 J_1$ basis waveforms are used in the estimation of $x(t)$. That is, $$\Phi_m = \sum_{j=1}^{J} \sum_{i=1}^{N} \int (G_{ij}(t) - \hat{x}_j(t))^2 dt \quad (41)$$

$$= \left[ \sum_{j=1}^{J} \sum_{i=1}^{N} \int (G_{ij}(t) - \bar{x}_j(t))^2 dt \right] + N \left[ \sum_{j=1}^{J} \int y_j^2(t) dt \right]$$

The first term in the right hand side (RHS) of equation (41) is independent of the individual $N_1 J_1$ basis waveforms used in obtaining the estimate $\hat{x}(t)$. The second term represents the increase in $\Phi_m$ and it depends on the individual and the total number of basis waveforms used in the estimation of $x(t)$. Letting $N_1 J_1 = M$, the $l^{th}$ component $y_l(t)$ of $y(t)$ can easily be estimated as $$y_l(t) = \sum_{j=M+1}^{NJ} \left\{ \left( \frac{1}{N} \sum_{m=1}^{N} R((l-1)N + m,j) \right) \left[ \sum_{i=1}^{J} \left( \sum_{k=1}^{N} R((i-1)N + k,j) G_{ki}(t) \right) \right] \right\} \quad (42)$$

Use of equation (42) in equation (41) yields $$\Phi_m = \bar{\Phi}_m + \frac{1}{N} \sum_{j=M+1}^{NJ} \lambda_j \left[ \sum_{i=1}^{J} \sum_{l=1}^{N} R((i-1)N + l,j))^2 \right] \quad (43)$$

Equation (43) then provides a relationship between $\Phi_m$, $\bar{\Phi}_m$, the individual and the total number of basis waveforms used in the estimation of common signal vector $x(t)$. This quotient may then be used as an indication denoting importance of individual basis wave forms in the common signal estimation.

Finally, in the third mode, stage 14 functions to estimate the common signal using signal correlations at different time lags. Let the vector $\psi(t)$ be formed by column stacking the elements of basis waveforms matrix $\Psi(t)$. Let the common signals of the groups be estimated as a linearly filtered version of the basis waveforms $\Psi_l(t)$, $1 \leq l \leq M = N_1 J_1$. That is $$x_l(t) = \sum_{l=1}^{M} (f_{jl}(t) * \psi_l(t)) = \sum_{s=0}^{m} \sum_{l=1}^{M} f_{jl}(s) \psi_l(t-s) \quad (44)$$

Let $$f_s = \begin{bmatrix} f_{11}(s) f_{12}(s) \ldots f_{1M}(s) \\ f_{21}(s) f_{22}(s) \ldots f_{2M}(s) \\ \vdots \quad \vdots \quad \vdots \\ f_{J1}(s) f_{J2}(s) \ldots f_{JM}(s) \end{bmatrix} \quad (45)$$

and $$\psi_{t-s} = (\psi_1(t-s) \psi_2(t-s) \ldots \psi_M(t-s))^T \quad (46)$$

An estimate of the vector $x(t)$ of the common signals can be written as $$\hat{x}(t) = \sum_{s=0}^{m} f_s \psi_{t-s} \quad (47)$$

The filters $f_s$ can be estimated by the minimization of the criterion $\Phi$, where $$\Phi = tr\{\int [(G(t) - c\hat{x}^T(t))(G(t) - c\hat{x}^T(t))^T]dt\} \quad (48)$$

Let $$\left. \begin{array}{l} \phi_{\psi G}(-s) = \int \psi_{t-s} c^T G(t) dt \\ \text{and} \\ \phi_{\psi\psi}(r-s) = \int \psi_{t-s} \psi_{t-r}^T dt \end{array} \right\} \quad (49)$$

Using equations (47) and (49) in equation (48), we get $$\Phi = tr[\int G(t) G^T(t) dt] = 2tr \left[ \sum_{s=0}^{m} f_s \phi_{\psi G}(-s) \right] + \quad (50)$$

$$Ntr \left[ \sum_{r=0}^{m} \sum_{s=0}^{m} f_s \phi_{\psi\psi}(r-s) f_r^T \right]$$

Differentiating $\Phi$ with respect to $f_l$ and equating the resulting expressions to zero, then yields $$N \left[ f_l \phi_{\psi\psi}(0) + \sum_{\substack{r=0 \\ \neq l}}^{m} f_r \phi_{\psi\psi}(l-r) \right] = \phi_{G\psi}(l); \quad (51)$$

$$l = 0, 1, 2, \ldots, m.$$

The equations (51) can be very efficiently computed for $f_l$ by exploiting the Block Toeplitz structure in well-known manner.

Figure 4A:
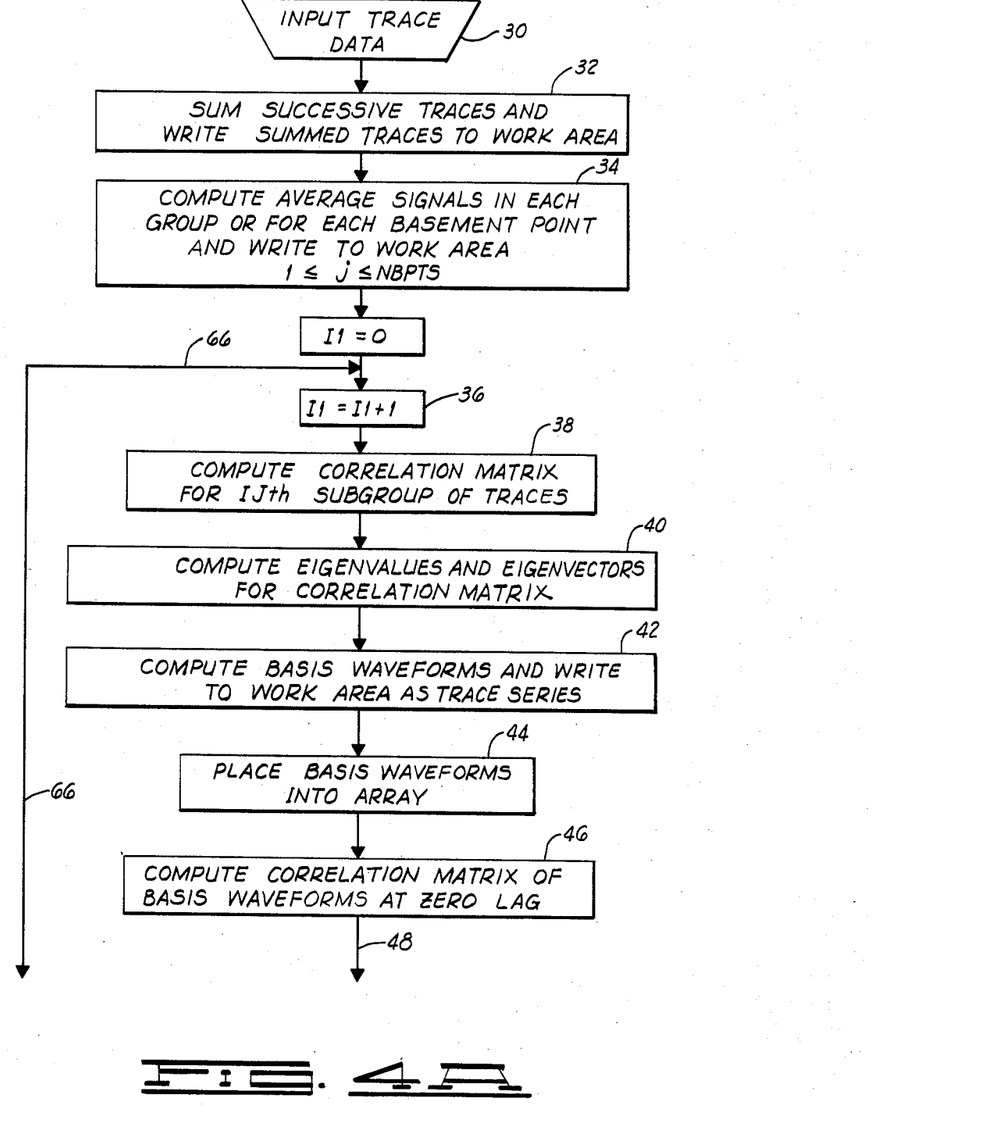
FIGS. 4A and 4B are a flow diagram of the computational processing in carrying out the method of the present invention.
Figure 4B:
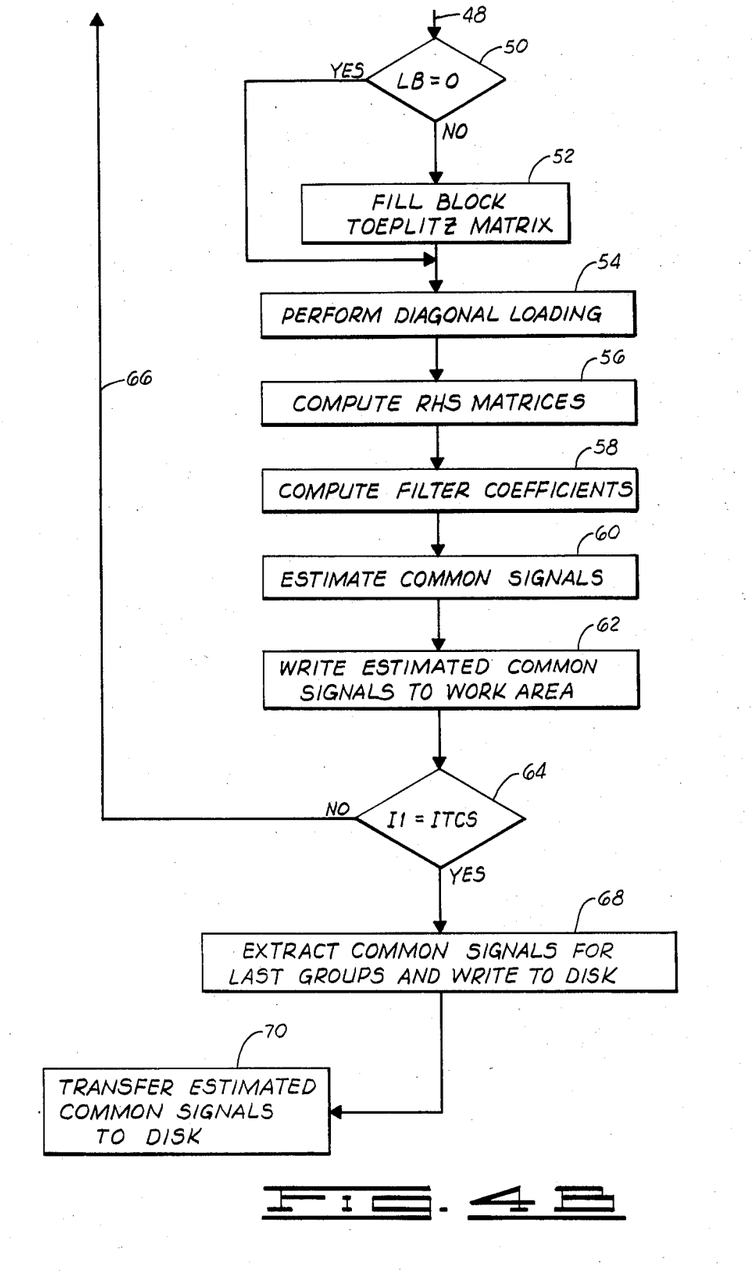

FIGS. 4A and 4B illustrate the functional flow diagram of the computer process to the present invention. The program is presently implemented using the CYBER computer system. The program functions in concert with well-known seismic subroutines that are termed as follows:

EIGEN—The computation of eigenvalues and eigenvectors of a real symmetric matrix SYMINV—The inversion of a real symmetric matrix The key parameters of the program, while subject to different nomenclature, may be identified as follows:

NBPTS—The number of Basement points
NTRG—The number of traces per Basement point (Group)
NTSG—The number of successive traces for summation
NCGS—The number of consecutive groups used for common signal estimation
NSG(i)—The number of subgroups per group i, $1 \leq i \leq NCGS$
NKT(i)—The number of traces to skip in the file for subgroup i.
ND(i)—The number of traces to do in the file for subgroup i
NKS(i)—The number of samples to skip at the beginning of the traces of subgroup i where $1 \leq k \leq NSG(j)$ and $1 \leq j \leq NCGS$
The number of samples to process
NSK—The number of sample points to skip for signal detection
PR—Percentage factor for diagonal loading
LB—Number of lags used for correlation
N1J1—Number of basis waveforms used for common signal estimation.
NCR—Number of correlations to be performed for signal detection based on correlation peak
NTRT—Total number of traces
ITCS—NBPTS+1−NCGS—Iterations for common signal extraction
ITES—Number of summed traces
NTGC—NTRG/NTSG—Number of traces in each group for common signal extraction
NTCC—NTGC/NCGS—Number of traces in NCGS groups for common signal extraction For a typical processing of a selected seismic section, numerical input for the above parameters will select the number of classes as well as the number of subgroups per class, and designation of traces to skip and traces to include defines the vertical traces of the section which will be subjected to processing. In addition, the groups and classes are further defined vertically on the seismic section by selection of the number of sample points to skip NSK and the number of samples to undergo processing NSTR.

Referring more particularly to FIGS. 4A and 4B, the families of data signals, for example common depth point traces of sucessive basement points along a selected survey line, are input at stage 30. The input trace data would usually be pre-processed through various dynamic and static corrections, and clean-up procedures. The flow stage 32 then functions to sum NTSG successive traces which are then written into the work area as the ITES number of summed traces. The next stage 34 computes the average signals in each of the selected groups or for each basement point and the data is written as traces ITES+j, $1 \leq j \leq NBPTS$ (work area). Data is moved through the main co-op combining stages 36 to a stage 38 which computes the correlation matrix RM for the IJ$^{th}$ NCGS subgroup of traces.

Flow stage 40 computes the eigenvalues and eigenvectors of the correlation matrix and the function proceeds to stage 42 for computation of the N1J1 basis waveform which are then written to the work area as traces ITES+NBPTS+j, $1 \leq j \leq N1J1$, and flow stage 44 places a basis waveform into the array. Flow stage 46 then computes the correlation matrix of basis waveforms at zero lag for entry on line 48 (to FIG. 4B) to a decision stage 50 which queries as to whether or not all LB or time lags are to be used for correlation. If negative, flow proceeds to stage 52 for filling of the Block Toeplitz matrix in accordance with a well-known subroutine. If decision stage 50 queries affirmative, then stage 52 is bypassed and data proceeds with performance of diagonal loading of the matrix in stage 54.

Flow stage 56 performs computation of the RHS matrices with computation of filter co-efficients in stage 58 and estimation of common signals in stage 60. Thereafter, the estimated common signal is written to work area as a trace ITES+NBPTS+N1J1+I1 and flow proceeds to decision stage 64 to query whether or not I1 is equal to ITCS, the required iteration for common signal extraction. If negative, flow is recycled via line 66 back to the main co-op stage 36. If affirmative, flow proceeds with extraction of common signals and placement in disk in stage 68 and subsequent transfer of estimated common signals to disk in flow stage 70.

Utilization of the processed data can then be employed in various output display schemes to provide desired presentation of data. Such data outputs may take various forms and/or be subjected to further display processing. The classifications and the projections of the signals to be detected onto the best basis waveforms may be written into the file of standard display program. This file can then be processed with additional subroutines in order to obtain various forms of output displays such as scatter plots, printout of trace numbers, location of correlation peaks, correlation of maximum values, trace classifications, etc.

Referring again to FIG. 1, the operations of extractor stages 12 and 14 can be used variously. For example, the derived data may be the extract of the common signals of several groups of signals wherein the information from all the signals is taken into account. Such common signal extraction has a wide variety of applications in seismic signal processing. These include such as stacking of moveout corrected common depth point traces, mixing of signals, noise filtering, wave migration, etc.

Some typical processing results using the process of waveform representation and recognition are described in the following and shown in FIGS. 5 through 10.

Figure 5:
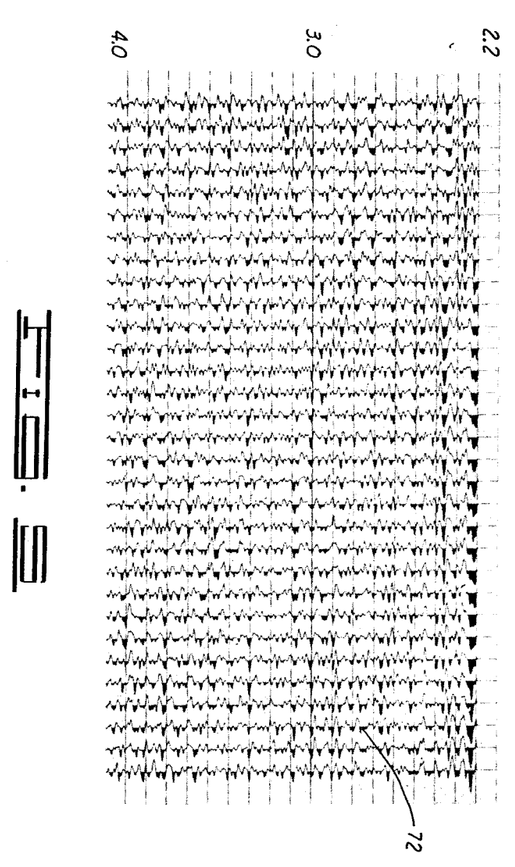
FIG. 5 illustrates the extracted common signals from a 48-fold common depth point seismic section using conventional stacking, i.e. a prior art procedure.
Figure 6:
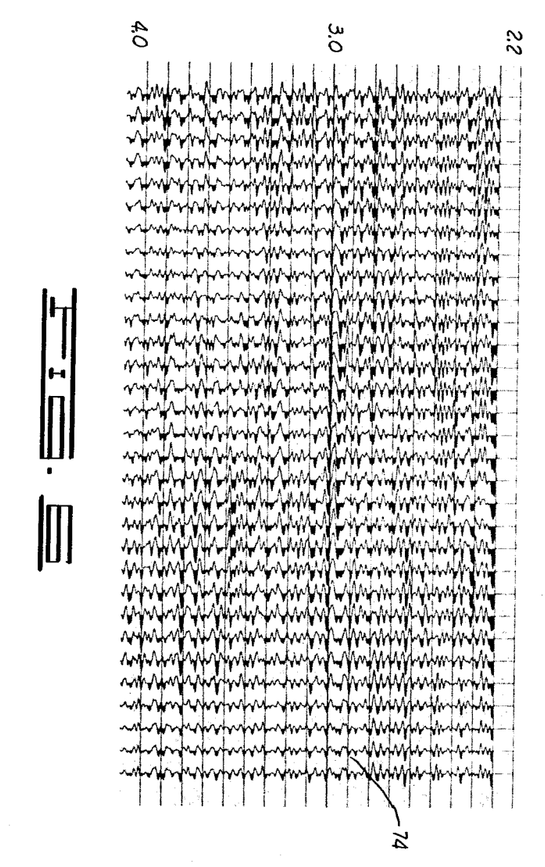
FIG. 6 illustrates the extracted common signals for the same 48-fold common depth point section using the present invention with one basis waveform and three groups.
Figure 7:
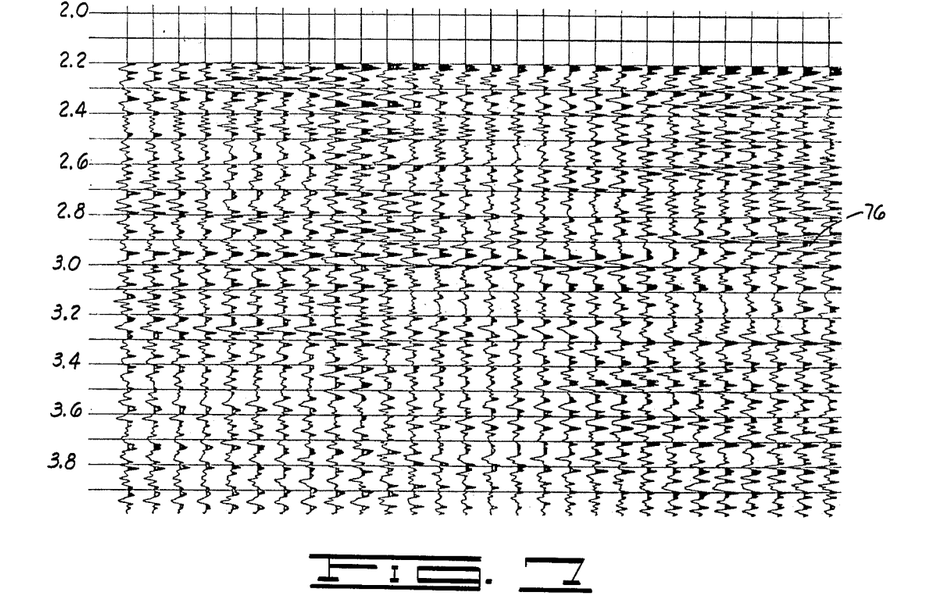
FIG. 7 shows the extracted common signals similar to FIG. 6 except using the present invention with three basis waveforms and three groups.

FIG. 5 is a seismic section along a selected survey line, a conventional stack of a 48-fold CDP section, and it may be noted that the processed data occupies a time window from 2.2 to 4.0 seconds travel time. The common signal estimation in this case is carried out by conventional stacking of the CDP gathers. One may notice the lack of event coherency and the dominance of the noise, perhaps due to the small fold of the data. FIG. 6 illustrates the same seismic section data wherein the common signals have been estimated in accordance with the processing of the present specification using one basis waveform and three consecutive gathers at a time. A marked coherency of events may be noticed, especially in comparison of events around 3.0 seconds as denoted at 72 and 74, respectively. FIG. 6 data provides a good illustration of the further definition of the seismic data relative to noise. FIG. 7 then illustrates the same seismic section with the common signals estimated by the present process but with an increased number of three basis waveforms while still using three consecutive CDP gathers. As can be noted at 76, the good event definition at 3.0 seconds has been somewhat obscured, and the overall event alignment and definition is somewhat diminished compared to FIG. 6 (using one basis waveform and three consecutive CDP gathers). There is a general observation that, as the number of basis waveforms is increased, the results approach that of initial raw, 48-fold CDP gather thereby indicating that the useful information about the signals is in just a few important basis waveforms.

Figure 8:
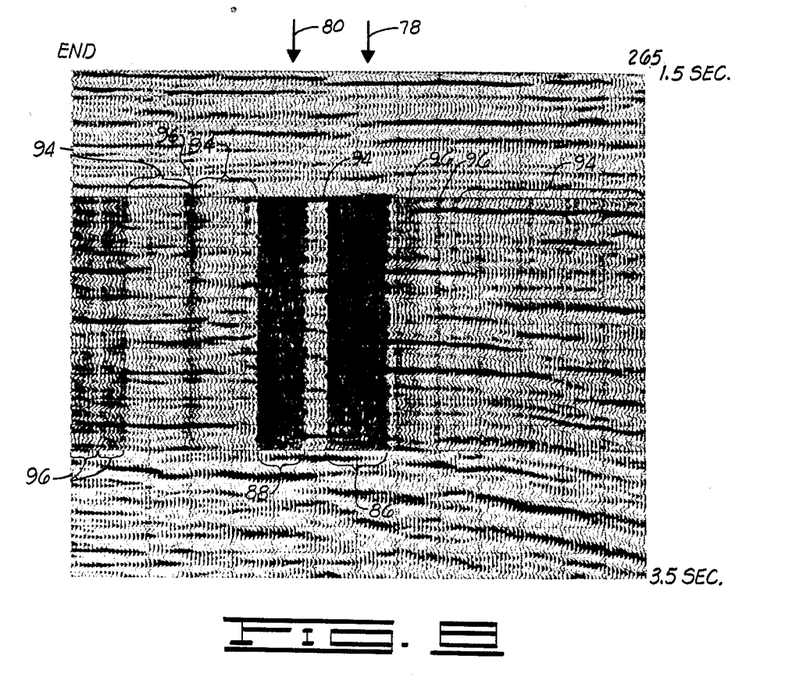
FIG. 8 illustrates a selected seismic section with training traces representative of a producing area and having related trace classification overlay.
Figure 9:
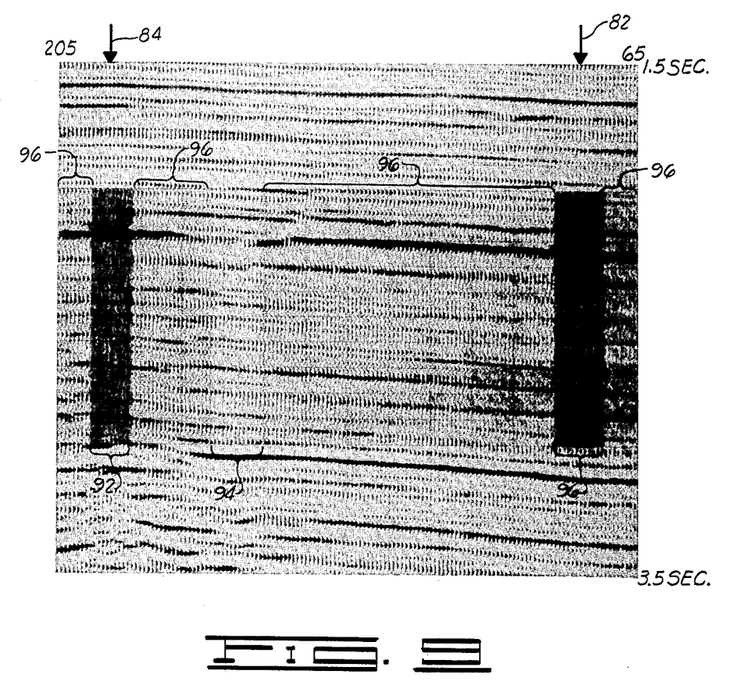
FIG. 9 illustrates a selected seismic section adjacent that section of FIG. 8 illustrating a dry area and including illustrative signal classifications.

FIGS. 8 and 9 illustrate a technique utilizing the present process for the detection of targets of interest on a seismic line. FIGS. 8 and 9 are seismic sections taken contiguously along the same survey lines, showing a time window of 1.5 to 3.5 seconds depth. FIG. 9 covered the survey line from surface positions 65 through 205 and FIG. 8 covered a portion of the same line extending on from surface positions 265 to the end, about surface position 405 in the progression. There were four wells closely adjacent to the seismic line, two producing and two dry, and these were projected onto the seismic survey line. Thus, the two producing walls were projected as at positions 78 and 80 of FIG. 8 and the two dry wells were projected as at positions 82 and 84 of FIG. 9. Time windows were then selected for the neighboring traces of the projections to represent the producing and non-producing zones. Thus, a pair of selected trace groups 86 and 88 of selected time window and lateral trace number were selected adjacent the producing well projection 78 and 80. In like manner, trace groups 90 and 92 were selected to include the dry hole projections 82 and 84. While not shown in the black and white representation, the actual output displays are characterized in that the producing trace groups 86 and 88 are color overlayed dark blue while the dry hole trace groups 90 and 92 are overlayed dark amber.

The common signals of the two groups of traces were then estimated using the recognition process of the present invention as shown in FIG. 1. Every trace of a line within a group window of interest is identified into either a producing zone type or a dry area type. Once common signals have been derived, this analysis is carried out in the signal detector stage 20 of FIG. 1. Subsequent display of the classified traces then result in the output as shown in black and white representation in FIGS. 8 and 9. That is, those traces satisfying the producing zone trace classification are presented in light blue as indicated by zones 94, and those traces exhibiting dry area trace qualities are presented as light amber zones 96. Thus, it can be seen that major portions of the total survey line, probably on the order of a number of miles, have been distinctively classified into dry area or producing locations thereby to facilitate selection of offset well sites, to define reservoir boundaries, etc.

Figure 10:
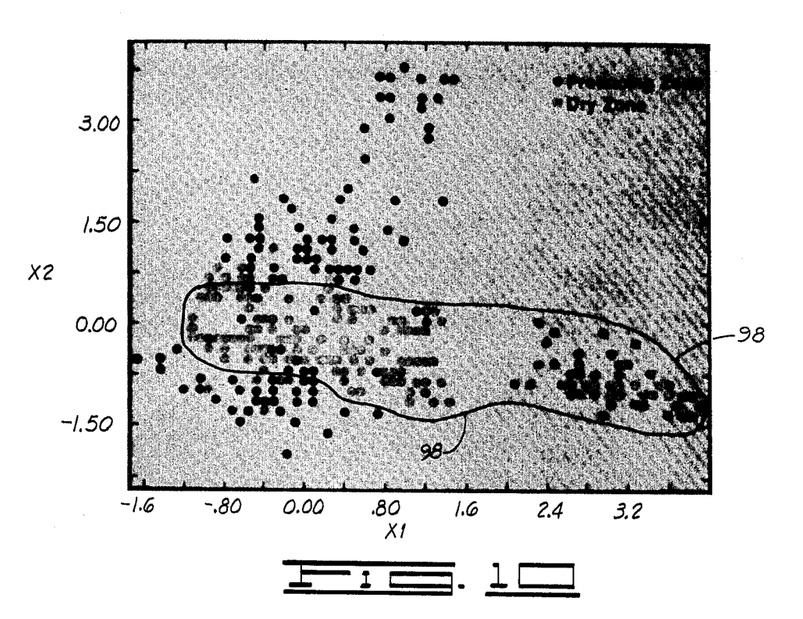
FIG. 10 is a scatter-plot of the trace projections of FIGS. 8 and 9 onto the two best basis waveforms.

FIG. 10 illustrates a scatter plot wherein the classified traces were projected onto the two best basis waveforms X1 and X2 are disposed on normal coordinates of the plots. Analysis of the plots readily indicates the separability between the two different types of traces representing the producing zone and the dry area. The scatter plot dots shown generally within the boundary outline 98 are plot values for dry zone basis waveform while all remaining points plot from the producing zone basis waveform. The separability is quite distinct.

The weights of waveform expansion can also be used as a set of features for signal detection in a pattern recognition framework. The maximization of an average distance between the feature vectors of the pair of groups of different types can be used as a criterion for the selection of an efficient set of features. When there are more than two groups, maximization of the minimum value of the distance between the pairs of groups or the expected value of the distance of the pairs of groups, can be used as a criterion for the selection of an efficient set of features. The extracted features can then be used in a decision theoretic framework for the detection and classification of signals.

Changes may be made in the combination and arrangement of steps or procedures as heretofore set forth in this specification and shown in the drawings; it being understood that changes may be made in the embodiment disclosed without departing from the spirit and scope of the invention as defined in the following claims.

The embodiments of the invention in which an exclusive property or privilege is claimed are defined as follows:

1. A method for processing seismic signal data comprising:
   inputting seismic signal data in at least one groups of related trace signals;
   summing and determining average signals for a selected number of successive traces in each of said at least one groups;

determining the correlation matrix for the at least one groups and constructing plural orthonormal basis waveforms;

estimating the common signals of said at least one groups of a linear combination of selected ones of said orthonormal basis waveforms; and outputting the common signals as a noise reduced representation of said at least one groups of seismic signal data.

2. A method as set forth in claim 1 wherein said at least one groups comprise:

plural groups of selected time windows of successive traces of seismic section data.

3. A method as set forth in claim 2 wherein:

said plural groups of traces are selected to include specific subsurface characteristics and anomalies in order to derive a representative common signal.

4. A method as set forth in claim 2 that further includes:

correlation detecting additional test signal seismic traces with selected common signals to classify the test signal traces as to type in accordance with signal content.

5. A method as set forth in claim 4 wherein:

said correlation detection classifies as to stratigraphic response.

6. A method as set forth in claim 4 wherein:

said correlation detection classifies as to lithologic response.

7. A method as set forth in claim 4 wherein:

said correlation detection classifies as to existence of hydrocarbon producible zones.

8. A method as set forth in claim 1 wherein said at least one groups comprise:

plural common depth point gathers of time and location related seismic trace data.

9. A method as set forth in claim 8 wherein said step of estimating the common signals comprises:

selecting best orthonormal basis waveforms in lesser number to enable greater common signal to noise ratio.

10. A method as set forth in claim 1 wherein said step of estimating the common signals comprises:

selecting best orthonormal basis waveforms in lesser number to enable greater common signal to noise ratio.

11. A method as set forth in claim 1 wherein said step of inputting comprises:

defining time windows of selected seismic travel time and offset from common depth point processed seismic data for each of said groups, said time windows including subterrain response of particular seismic significance.

12. A method as set forth in claim 1 wherein the step of determining the correlation matrix and constructing, comprises:

determining the correlation matrix for each subgroup of said selected number of successive traces;

computing eigenvalues and eigenvectors for each correlation matrix; and computing a selected number of said basis waveforms and writing to work storage area.

13. A method as set forth in claim 1 wherein said step of estimating the common signals, comprises:

computing the correlation matrix for each of said basis waveforms at zero time lag;

diagonal loading for computation of RMS matrix and filter coefficients; and estimating the common signals and writing to work storage area until completion of a preset number of iterations that completes common signal extraction.

14. A method as set forth in claim 1 wherein said step of estimating the common signals further includes:

developing a criterion of the sum of the squares of errors for enabling best combination of selected ones of the plural orthonormal basis waveforms in estimating the common signal.

15. A method for extraction of the common signal components from at least one group of time and location related seismic signals, comprising:

inputting the at least one group of seismic signals, each signal consisting of a common signal plus noise;

expanding each seismic signal as a linar combination of data derived orthonormal basis waveforms;

assessing the relative weights of the orthonormal basis waveforms and extracting a representative subset of basis waveforms; and estimating the common signal for each group of seismic signals using the representative subset of basis waveforms.

16. A method as set forth in claim 15 wherein:

said at least one group of seismic signals is plural groups J of N signals each.

17. A method as set forth in claim 16 which further includes:

selecting the time/space window for each group to include selected subsurface characteristics of interest; and correlating the extracted common signal for each group with selected other seismic trace signals thereby to categorize relative to said subsurface characteristics.

18. A method as set forth in claim 17 wherein:

said selected time/space windows include a hydrocarbon producing zone and a hydrocarbon non-producing zone.

* * * * *